United States Patent
Cranna

(10) Patent No.: US 6,276,248 B1
(45) Date of Patent: Aug. 21, 2001

(54) BAND SAW BLADE HAVING REDUCED NOISE AND UNIFORM TOOTH LOADING CHARACTERISTICS

(75) Inventor: Mark Cranna, Somers, CT (US)

(73) Assignee: American Saw & Manufacturing Company, East Longmeadow, MA (US)

( * ) Notice: Subject to any disclaimer, the term of this patent is extended or adjusted under 35 U.S.C. 154(b) by 0 days.

(21) Appl. No.: 09/435,108

(22) Filed: Nov. 5, 1999

(51) Int. Cl.⁷ ............................................... B27B 33/02
(52) U.S. Cl. ........................... 83/848; 83/846; 83/847; 83/851
(58) Field of Search ........................... 83/848, 851, 847, 83/849, 850, 661, 846

(56) References Cited

U.S. PATENT DOCUMENTS

| | | |
|---|---|---|
| Re. 31,433 | 11/1983 | Clark .................................... 83/846 |
| 603,128 * | 4/1898 | Clemson ................................ 83/846 |
| 2,568,870 | 9/1951 | Ronan ..................................... 29/95 |
| 3,292,674 * | 12/1966 | Turner .................................... 83/846 |
| 4,179,967 | 12/1979 | Clark ..................................... 83/846 |
| 4,292,871 | 10/1981 | Neumeyer et al. .................... 83/661 |
| 4,423,553 * | 1/1984 | Miyawaki ............................. 83/848 |
| 4,557,172 * | 12/1985 | Yoneda ................................. 83/848 |
| 4,640,172 | 2/1987 | Kullmann et al. .................... 83/835 |
| 4,727,788 * | 3/1988 | Yoshida et al. ...................... 83/848 |
| 4,813,324 * | 3/1989 | Yoshida et al. ...................... 83/851 |
| 4,958,546 * | 9/1990 | Yoshida et al. ...................... 83/835 |
| 5,018,421 | 5/1991 | Lucki et al. .......................... 83/835 |
| 5,094,135 | 3/1992 | Nakahara et al. .................... 83/847 |
| 5,331,876 * | 7/1994 | Hayden, Sr. .......................... 83/851 |
| 5,410,935 | 5/1995 | Holston et al. ....................... 83/851 |
| 5,425,296 | 6/1995 | Kullmann et al. .................... 83/846 |
| 5,477,763 | 12/1995 | Kullmann ............................. 83/846 |
| 5,501,129 | 3/1996 | Armstrong et al. .................. 83/848 |
| 5,606,900 | 3/1997 | Stoddard .............................. 83/846 |
| 5,697,280 | 12/1997 | Armstrong et al. .................. 83/848 |
| 5,868,058 | 2/1999 | Senegas ............................... 83/846 |
| 6,003,422 * | 12/1999 | Holston ................................ 83/846 |

* cited by examiner

*Primary Examiner*—M. Rachuba
(74) *Attorney, Agent, or Firm*—Cummings & Lockwood

(57) ABSTRACT

A band saw blade having relatively extended pitch patterns of eight of more teeth exhibits relatively low noise and vibration during cutting operations, and substantially uniform tooth loading characteristics. The band saw blade defines set patterns within each pitch pattern, and each set pattern is defined by an unset leading tooth followed by a plurality of offset trailing teeth. Each tooth within each set pattern defines a pitch between the respective tooth and the preceding tooth in the cutting direction of the saw blade, and an accumulated pitch between the respective tooth and the preceding tooth of like set direction in the cutting direction of the saw blade. The ratio of pitch to accumulated pitch for each tooth within each set pattern increases from one tooth to the next in the direction opposite the cutting direction of the saw blade for substantially uniformly distributing the chip load over the teeth of the saw blade. In addition, during cutting operations, each tooth entering or exiting the workpiece defines a different pitch or forcing frequency than does every other tooth simultaneously entering or exiting the workpiece, or successively entering or exiting the workpiece, to thereby minimize noise and vibration during cutting operations.

27 Claims, 3 Drawing Sheets

BAND SAW BLADE HAVING REDUCED NOISE AND UNIFORM TOOTH LOADING CHARACTERISTICS

FIELD OF THE INVENTION

The present invention relates to saw blades, and more particularly, to band saw blades having relatively long pitch patterns with tooth pitch set to minimize noise and vibration and to substantially uniformly distribute chip loading over the teeth of the blade during cutting operations.

BACKGROUND INFORMATION

Typical prior art band saw blades comprise recurrent or repetitive patterns of teeth, wherein each pattern is defined by one or more groups of teeth including an unset leading tooth followed by a plurality of alternately set trailing teeth. Each recurrent pattern of teeth is typically referred to as the "pitch" pattern, "repeat" pattern or "milling" pattern of the band saw blade, since each pattern may be formed by a respective milling tool. Each pitch pattern may, in turn, define respective "set patterns" indicative of the manner in which the teeth of the pitch pattern are set. Each set pattern is defined by an unset leading tooth and a plurality of alternately set trailing teeth. For example, an "eight" tooth pitch pattern may define "three/five" set patterns. In this case, the pitch pattern comprises eight teeth, consisting of a first set pattern of three teeth, and a second set pattern of five teeth (thus the designation "three/five" set pattern). The first set pattern of three teeth is defined by a first unset leading tooth and two alternately set trailing teeth, and the second set pattern of five teeth is defined by a first unset leading tooth and four alternately set trailing teeth. Similarly, a ten tooth pitch pattern having a "three/seven" set pattern consists of a first set pattern of three teeth and a second set pattern of seven teeth, with each set pattern including an unset leading tooth followed by alternately set trailing teeth. Each unset leading tooth typically has a plane of symmetry defining the sawing plane of the blade, and which is parallel to the side surfaces at the base of the blade. The alternately set trailing teeth are typically either "right" set or "left" set, wherein each "right set" tooth is tilted or set at a predetermined angle to the right side of the plane of symmetry of the unset leading tooth, and each "left set" tooth is tilted or set at a predetermined angle to the left side of the plane of symmetry of the unset leading tooth. Typically, the first tooth in the cutting direction of the band saw blade of a particular set direction within each set pattern is referred to as the "primary" tooth, the next tooth in the set pattern of the same or like set direction is referred to as the "secondary" tooth, the next tooth in the set pattern of the same or like set direction is referred to as the "tertiary" tooth, and so on.

Certain prior art band saw blades have relatively long pitch patterns of, for example, eight or more teeth. For example, one prior art band saw blade manufactured by Amada Company, Ltd. of Japan under the designation "SVGLB 1.1/1.5" has an eight tooth pitch pattern, and a three/five set pattern. Another prior art band saw blade manufactured by Amada Company, Ltd. of Japan under the designation "3/6MVGLB" has an extended pitch pattern of approximately 23 teeth.

One drawback associated with these prior art band saw blades is that typically there is an uneven distribution of the chip load over the teeth within the relatively long pitch patterns. For example, within each group of teeth of like set direction, the secondary teeth typically bear a lesser chip load than do the corresponding primary teeth, and the tertiary teeth typically bear a substantially lesser chip load than do the corresponding secondary and primary teeth. As a result, the teeth may tend to wear unevenly and to inefficiently cut workpieces.

Yet another drawback associated with these and other prior art band saw blades, is that many of the teeth define the same pitch as do other teeth within the same pitch or set pattern. Accordingly, when cutting a workpiece, at least several of the teeth defining the same pitch may be simultaneously entering and exiting the workpiece, or several teeth defining the same pitch may be successively entering and/or exiting the workpiece, thus causing substantial vibration and noise during cutting operations.

Those skilled in the band saw blade art have recognized that a saw tooth edge having a "variable pitch" pattern may avoid the problems of excessive noise and vibrations brought about by equally spaced teeth impacting the workpieces in equal time intervals. Historically, "variable pitch" saw tooth patterns have been composed of repetitive groups of teeth arranged with progressive variations in the pitch between successive pairs of teeth in the cutting direction of the saw blade. The pitch distance is the distance between corresponding points on adjacent teeth, and typically is measured between the tips of adjacent teeth. In typical prior art variable pitch band saw blades, the variations in pitch start at the leading end of the saw blade, extend toward the trailing end of the saw blade, and are cyclical from fine to course and back to fine again. A lesser pitch distance between adjacent teeth is referred to as "fine", whereas a greater pitch distance between adjacent teeth is referred to as "coarse". Although these prior art variable pitch saw blades exhibit reduced levels of noise and vibration, these advantages frequently are achieved at the expense of reduced cutting efficiency and cutting rates of the saw blades. In particular, if these typical variable pitch patterns were applied to band saw blades having extended pitch patterns of eight or more teeth, the secondary, tertiary and possibly further successive teeth of like set direction would have significantly reduced chip loads in comparison to the preceding teeth of like set direction, thus significantly reducing the cutting efficiency and/or cutting rate of such saw blades.

Accordingly, it is an object of the present invention to overcome the above-described and other drawbacks and disadvantages of prior art band saw blades, and to provide band saw blades having extended pitch patterns of eight or more teeth that exhibit reduced noise and vibration and substantially uniform tooth loading characteristics.

SUMMARY OF THE INVENTION

The present invention is directed to a band saw blade for cutting a workpiece and generating a chip load on each tooth upon cutting the workpiece. The band saw blade of the invention comprises a plurality of teeth defining a pitch pattern of at least eight teeth, and set patterns within each pitch pattern. Each set pattern includes an unset leading tooth followed by a plurality of offset trailing teeth. Each tooth within each set pattern defines a pitch between the respective tooth and the preceding tooth in the cutting direction of the saw blade, and an accumulated pitch between the respective tooth and the preceding tooth of like set direction in the cutting direction of the saw blade. In addition, the ratio of pitch to accumulated pitch for each tooth of like set direction within each set pattern increases from one tooth to the next in the direction opposite the cutting direction of the saw blade for substantially uniformly distributing the chip load over the teeth of the saw blade.

Preferably, the plurality of teeth define an even number pitch pattern of at least eight teeth, and odd number set patterns within each pitch pattern. For example, in one embodiment of the present invention, the plurality of teeth define an eight tooth pitch pattern, and a three/five set pattern. In another embodiment of the present invention, the plurality of teeth define a ten tooth pitch pattern, and a three/seven set pattern. In each of these and other embodiments of the present invention, the ratio of pitch to accumulated pitch within each set pattern is greater for the secondary teeth in comparison to the primary teeth of like set direction, and is still greater for the tertiary teeth in comparison to the secondary teeth of like set direction.

In accordance with another aspect of the present invention, each tooth defines a different pitch or forcing frequency than does every other tooth substantially simultaneously entering or exiting the workpiece, and/or successively entering or exiting the workpiece, while cutting the workpiece, to thereby minimize noise and vibration during cutting operations. In the preferred embodiments of the invention, every tooth defines a different pitch or forcing frequency than does every other tooth in the respective pitch pattern. Alternatively, every tooth may define a different pitch or forcing frequency than does every other tooth in its respective set pattern.

One advantage of the band saw blades of the present invention is that the relatively long or extended pitch patterns of eight or more teeth in combination with the different forcing frequencies of the teeth minimizes noise and vibration during cutting operations, and significantly improves the break-in characteristics of the blades in comparison to like prior art band saw blades. Yet another advantage of the present invention is that the ratio of pitch to accumulated pitch for each group of teeth of like set direction substantially evenly distributes the chip load over these teeth, thus providing for relatively long-lasting and efficient cutting band saw blades.

These and other objects and advantages of the present invention will become apparent in view of the following detailed description of preferred embodiments and accompanying drawings.

DETAILED DESCRIPTION OF THE PREFERRED EMBODIMENTS

Figure 1:
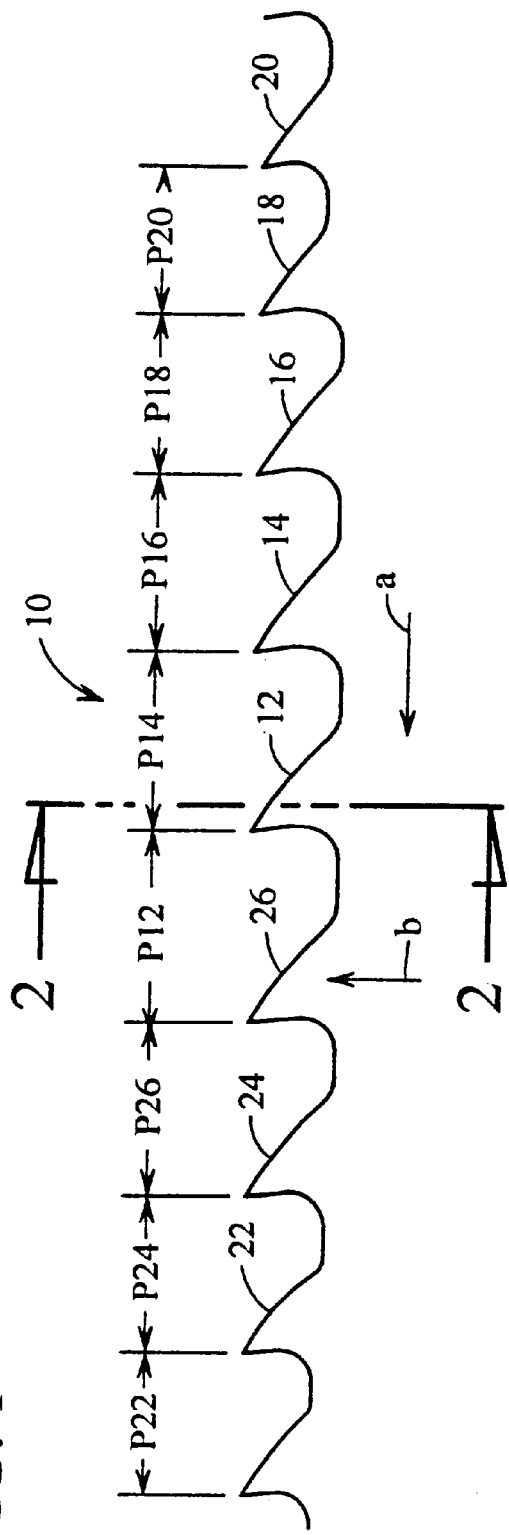
FIG. 1 is a somewhat schematic, side elevational view of a first embodiment of a band saw blade of the present invention defining an eight tooth pitch pattern, and a three/five set pattern.

In FIG. 1 a band saw blade embodying the present invention is indicated generally by the reference numeral 10. The band saw blade 10 defines a cutting direction indicated by the arrow "a", and a feed direction indicated by the arrow "b". The band saw blade 10 comprises a plurality of recurrent or repetitive patterns of teeth defining an eight tooth pitch pattern. Each pitch pattern is defined by a recurrent group of eight successive teeth indicated by the reference numerals 12, 14, 16, 18, 20, 22, 24 and 26. As shown in FIG. 1, each tooth defines a respective pitch or tooth spacing P12 through P26. In the preferred embodiments of the present invention, and as indicated in FIG. 1, the pitch or tooth spacing is measured between the tips of adjacent teeth. However, as may be recognized by those skilled in the pertinent art based on the teachings herein, the pitch or tooth spacing may be measured between any of numerous other corresponding points between adjacent teeth.

Figure 2:
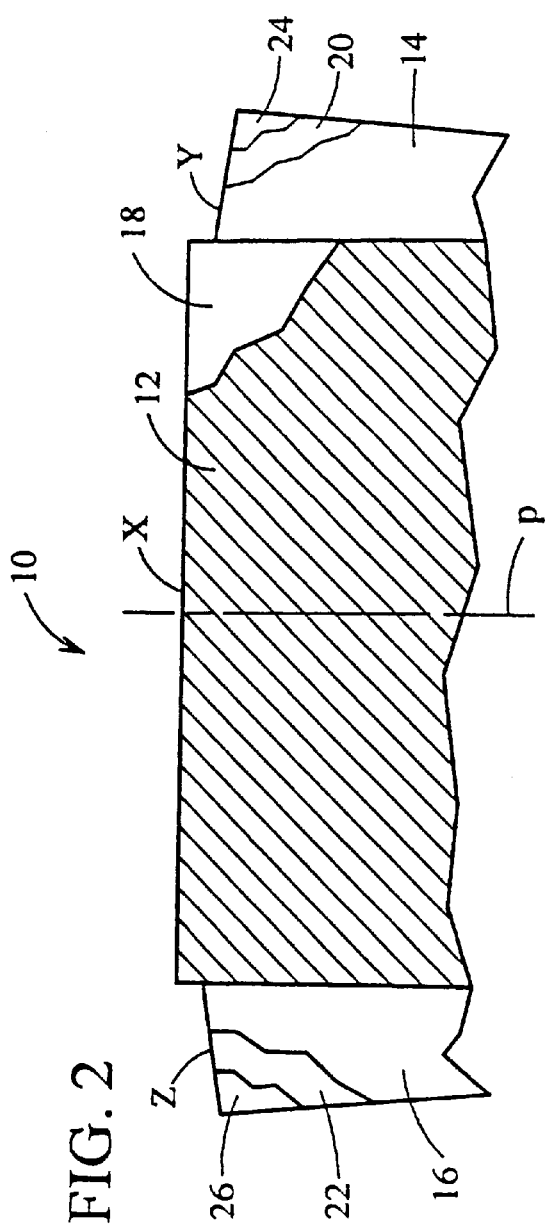
FIG. 2 is a partial cut-away, cross-sectional view of the band saw blade of FIG. 1 taken along line 2—2 of FIG. 1.

Each eight tooth pitch pattern of the band saw blade 10 defines a three/five set pattern. Thus, in the preferred embodiment of FIG. 1, a first set pattern is defined by the three successive teeth 12, 14 and 16, and a second set pattern is defined by the next five successive teeth 18, 20, 22, 24 and 26. As shown in FIG. 2, the first set pattern is defined by a first unset leading tooth 12, a primary right set trailing tooth 14, and a primary left set trailing tooth 16. The second set pattern is defined by a first unset leading tooth 18, a primary right set trailing tooth 20, a primary left set trailing tooth 22, a secondary right set trailing tooth 24, and a secondary left set trailing tooth 26. As also shown in FIG. 2, each unset leading tooth 12 and 18 is symmetrical about the plane of symmetry "p" of the band saw blade 10, and defines a cutting edge substantially located within a cutting plane "x" which is approximately perpendicular to the plane of symmetry "p". Each right set trailing tooth 14, 20 and 24 is tilted or set to the right in the drawing relative to the plane of symmetry "p" (when viewed from the cutting direction "a" of the saw blade), and defines a cutting edge substantially located within a cutting plane "y" tilted or set at an acute angle relative to the plane of symmetry "p". Similarly, each left set trailing tooth 16, 22 and 26 is tilted or set to the left in the drawing relative to the plane of symmetry "p", and defines a cutting edge substantially located within a cutting plane "z" tilted or set an acute angle relative to the plane of symmetry "p". As can be seen in FIG. 2, each set tooth defines substantially the same magnitude of set as the other teeth of like set direction, thus defining a "single level" set blade, and further defines the same tooth height as the other teeth of like set direction.

As indicated above, the pitch of each tooth is the distance in the elongated direction of the saw blade between corresponding points of the respective tooth and the preceding tooth in the cutting direction of the saw blade. Thus, as shown in FIG. 1, the pitch may be measured between the tips of adjacent teeth. The accumulated pitch of a tooth, on the other hand, is the sum of the pitch distances between the respective tooth and the nearest preceding tooth of the same or like set direction in the cutting direction of the saw blade. Thus, for example, with reference to FIG. 1, the accumulated pitch of the unset leading tooth 18 is the sum of the pitch distances P14, P16 and P18, i.e., the sum of the pitch distances between the unset leading tooth 18 and the nearest preceding unset leading tooth (12) in the cutting direction "a" of the saw blade. In accordance with the present invention, the ratio of pitch to accumulated pitch for each tooth of like set direction within each set pattern increases from one tooth to the next in the direction opposite the cutting direction of the saw blade for distributing the chip load over the teeth of the saw blade. Thus, the ratio of pitch to accumulated pitch is greater for each secondary tooth than for the corresponding primary tooth, is greater for each tertiary tooth than for the corresponding secondary and primary teeth, and so on. The pitch and accumulated pitch of each tooth in the illustrated embodiment of FIG. 1 are set forth in the following table:

| Tooth No. | Pitch No. | Set Direction | Pitch | Accumulated Pitch | Ratio of Pitch to Accumulated Pitch |
|---|---|---|---|---|---|
| 22 | P22 | Left | 0.243 | 0.776 | 0.31 |
| 24 | P24 | Right | 0.267 | 0.510 | 0.52 |
| 26 | P26 | Left | 0.297 | 0.564 | 0.52 |
| 12 | P12 | Unset | 0.333 | 1.398 | 0.24 |
| 14 | P14 | Right | 0.310 | 0.940 | 0.33 |
| 16 | P16 | Left | 0.290 | 0.933 | 0.31 |
| 18 | P18 | Unset | 0.275 | 0.875 | 0.31 |
| 20 | P20 | Right | 0.258 | 0.823 | 0.31 |

As will be recognized by those of ordinary skill in the pertinent art based on the teachings herein, the specific pitch and accumulated pitch dimensions set forth in the preceding table are exemplary only, and any of numerous different dimensions may be selected depending upon the particular design criteria or other desired characteristics of the band saw blades within the teachings and scope of the present invention. For example, the gullet area of each tooth may be directly proportional to the accumulated pitch distance between that tooth and the next preceding tooth of like set direction, as disclosed in commonly-assigned U.S. patent application Ser. No. 08/967,279, now U.S. Pat. No. 6,003,422, which is hereby expressly incorporated by reference as part of the present disclosure. However, the chip load borne by each tooth is dependent, in part, on the accumulated pitch of the respective tooth. Accordingly, regardless of the particular pitch dimensions selected, the ratio of pitch to accumulated pitch for teeth of the same or like set direction increases within each set pattern from one tooth to the next in the direction opposite the cutting direction of the saw blade in order to substantially evenly distribute the chip load over the teeth of the saw blade.

Also in accordance with the present invention, and as illustrated in the table above, each tooth defines a different pitch than every other tooth within the respective set pattern, and preferably, defines a different pitch than every other tooth within the respective pitch pattern. One of the advantages of this feature of the present invention is that during cutting operations, each tooth entering or exiting the workpiece generates a different forcing frequency than every other tooth simultaneously entering or exiting the workpiece, or the other teeth successively entering or exiting the workpiece, thus substantially reducing noise and vibration during cutting operations, and facilitating blade break in. The forcing frequency ("f") of each tooth may be determined based on the band speed ("BS") and the pitch ("P") in accordance with the following equation: f=BS÷5P, wherein f is in cycles/second, BS is in feet/minute, and P is in inches. Thus, by providing each tooth within the pitch pattern with a different pitch, each tooth will generate a different forcing frequency upon cutting a workpiece. For relatively small workpieces, each tooth may define a different pitch than every other tooth within the respective set pattern, but not every other tooth in the respective pitch pattern, and still achieve the function of having each tooth entering or exiting the workpiece during cutting operations generate a different forcing frequency (f) than every other tooth simultaneously entering or exiting the workpiece, and/or successively entering or exiting the workpiece. However, in order to be sure that this function is achieved with respect to most, if not all workpieces, every tooth preferably defines a different pitch than every other tooth within the respective pitch pattern as illustrated, for example, in the table above.

Figure 3:
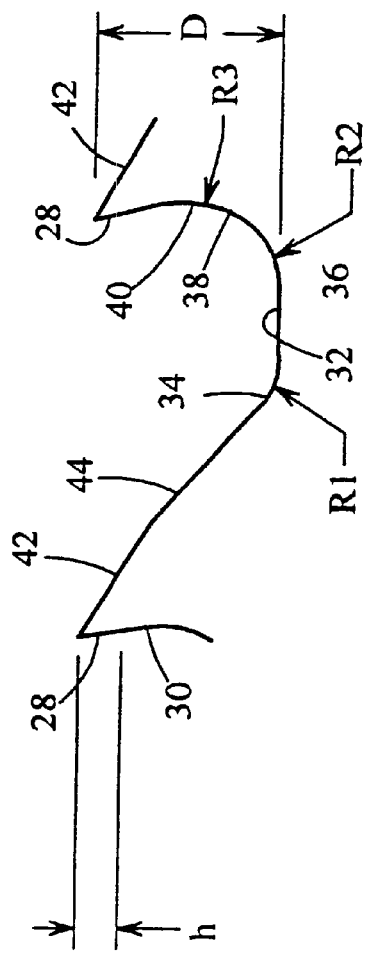
FIG. 3 is an enlarged view of a typical tooth of the band saw blade of FIG. 1 illustrating the tooth structure in further detail.

Turning to FIG. 3, a preferred tooth geometry for use in connection with the saw blade 10 of FIG. 1 is illustrated in further detail. Each tooth is preferably constructed in accordance with the teachings of co-pending, commonly assigned U.S. patent application Ser. No. 09/015,122, now U.S. Pat. No. 6,167,792 B1 which is hereby expressly incorporated by reference as part of the present disclosure. As shown in FIG. 3, each tooth preferably defines dual rake faces forming dual rake angles. Accordingly, a first rake face 28 defines a relatively aggressive rake angle and extends downwardly from the outermost point of the tip over only the usable portion of the tip during the life of the blade. In the embodiment of the present invention illustrated, the first rake face extends downwardly from the outermost point of the tip a distance "h", which is preferably within the range of about 10% through about 25% of the maximum gullet depth "D". A second rake face 30 extends downwardly from the first rake face 28 and defines a less aggressive rake angle than that of the first rake face in order to increase the mass of tooth material, and thus the strength and stiffness of the tooth. In the exemplary embodiment of FIG. 3, the first rake face 28 defines a first rake angle of approximately 12°, and the second rake face 30 defines a second rake angle within the range of about 7.1° through about 8.2°. As will be recognized by those of ordinary skill in the pertinent art based on the teachings herein, these rake angles are only exemplary and may take any of numerous different configurations depending upon the desired characteristics of the band saw blades of the invention. Preferably, however, the primary rake angle is within the range of about 8° through about 15°, and the secondary rake angle is within the range of about −5° through about 80°. Each tooth also defines a relatively deep gullet having a depth "D" such that the ratio of D/P is preferably within the range of about 39% through about 48%. In the exemplary embodiment of FIG. 3, D/P is approximately 47%.

As also shown in FIG. 3, a first flat 32 is defined at the base of each gullet, a first arcuate region 34 defined by a radius R1 is formed on one side of the first flat, a second arcuate region 36 defined by a second radius R2 is formed on the other side of the first flat, and points of tangency "T" are formed on each side of each arcuate region. For most teeth (other than relatively coarse teeth), the first flat 32 is located approximately at the set-bend plane of the teeth. Thus, the two arcuate surfaces 34, 36, plus the points of tangency on either side of each arc, significantly increase the mass and/or volume of material at the base of the gullet (also typically the region of the set-bend plane), and in turn significantly increase the overall strength of the tooth.

Also in accordance with the preferred tooth geometry, a second flat 38 extends upwardly from the second arcuate region 36 with a point of tangency "T" formed therebetween. A third arcuate region 40 is formed between the second flat 38 and the second rake surface 30, also with points of tangency "T" formed therebetween. The formation of the second flat 38 with arcuate portions on either side of the flat further increases the mass and/or volume of tooth material in this region, and therefore further increases the stiffness and/or strength of the tooth.

As also shown in FIG. 3, each tooth preferably defines dual relief surfaces, including a primary relief surface 42 extending rearwardly from the tip at a primary relief angle, and a secondary relief surface 44 extending between the primary relief surface and the arcuate region 34 of the adjacent tooth at a secondary relief angle. The primary relief angle is preferable less than the secondary relief angle in order to increase the strength of the tooth in the tip area, and the secondary relief angle is greater than the primary relief angle in order to achieve the desired gullet depth. In accordance with the present invention, the primary relief angle is within the range of about 25° through about 35°, and preferably within the range of about 28° through about 32°. Similarly, the second relief angle is within the range of about 35° through about 55°, and preferably is within the range of about 35° through about 48°.

Figure 4:
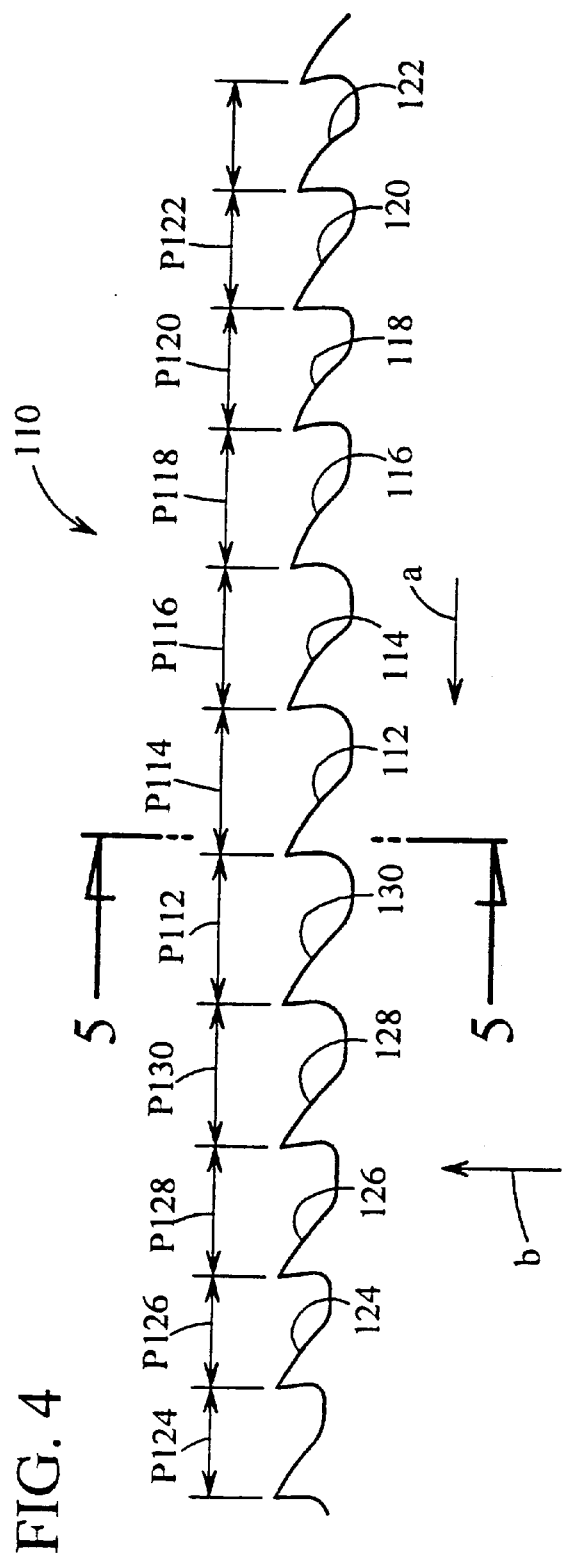
FIG. 4 is a somewhat schematic, side elevational view of a band saw blade of the present invention defining a ten tooth pitch pattern, and a three/seven set pattern.
Figure 5:
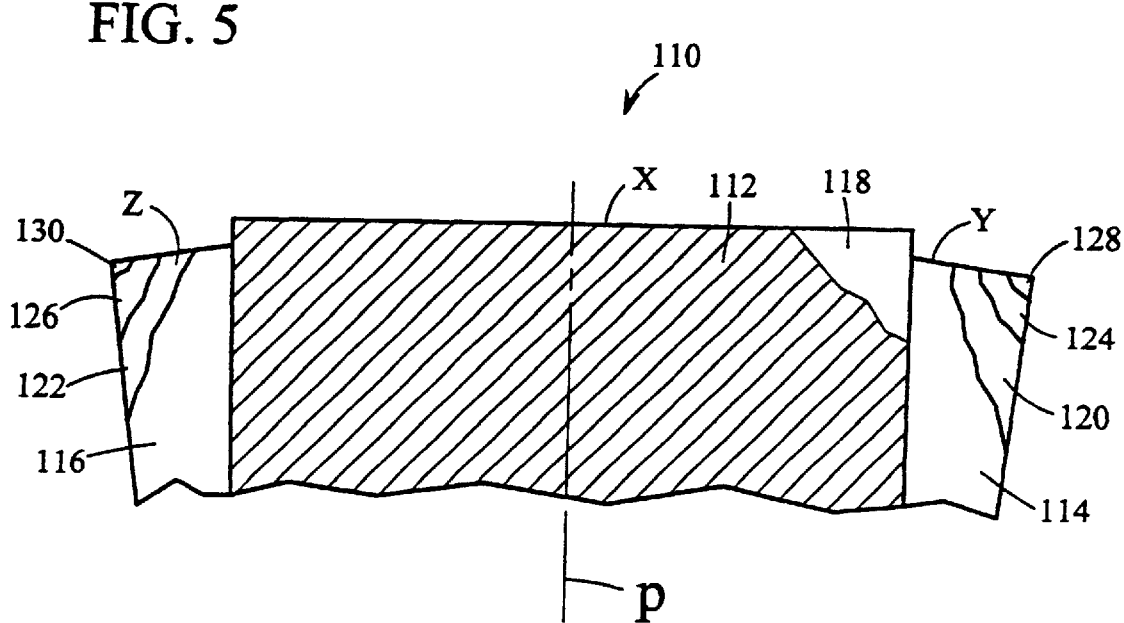
FIG. 5 is a partial cut-away, cross-sectional view of the band saw blade of FIG. 4 taken along line 5—5 of FIG. 4.

In FIG. 4, another band saw blade embodying the present invention is indicated generally by the reference numeral 110. The band saw blade 110 is substantially similar to the band saw blade 10 described above with reference to FIGS. 1–3, and therefore like reference numerals preceded the numeral 1 are used to indicate like elements. The primary difference between the band saw blade 110 is that it defines a ten tooth pitch pattern, and a three/seven set pattern. Otherwise, as with the previous embodiment, the ratio of pitch to accumulated pitch for each tooth of like set direction within each set pattern increases from one tooth to the next in the direction opposite the cutting direction of the saw blade for substantially evenly distributing the chip load over the teeth of the saw blade. In addition, each tooth defines a different pitch than every other tooth within the respective set pattern, and preferably, defines a different pitch than every other tooth within the respective pitch pattern. The pitch and accumulated pitch of each tooth in the embodiment of FIG. 4 are set forth in the following table:

| Tooth No. | Pitch No. | Set Direction | Pitch | Accumulated Pitch | Ratio of Pitch to Accumulated Pitch |
|---|---|---|---|---|---|
| 112 | P112 | Unset | 0.257 | 1.503 | 0.17 |
| 114 | P114 | Right | 0.249 | 0.747 | 0.33 |
| 116 | P116 | Left | 0.233 | 0.739 | 0.315 |
| 118 | P118 | Unset | 0.225 | 0.707 | 0.318 |
| 120 | P120 | Right | 0.209 | 0.667 | 0.313 |
| 122 | P122 | Left | 0.201 | 0.635 | 0.316 |
| 124 | P124 | Right | 0.185 | 0.386 | 0.479 |
| 126 | P126 | Left | 0.193 | 0.378 | 0.51 |
| 128 | P128 | Right | 0.217 | 0.410 | 0.529 |
| 130 | P130 | Left | 0.241 | 0.458 | 0.526 |

As will be recognized by those of ordinary skill in the pertinent art based on the teachings herein, the specific pitch and accumulated pitch dimensions set forth in the preceding table are exemplary only, and any of numerous different dimensions may be selected depending upon the particular design criteria or other desired characteristics of the band saw blades within the teachings and scope of the present invention.

For example, a further embodiment of the present invention having a ten tooth pitch pattern, and a three/seven set pattern defines the following alternative pitch distances:

| Tooth No. | Pitch No. | Set Direction | Pitch | Accumulated Pitch | Ratio of Pitch to Accumulated Pitch |
|---|---|---|---|---|---|
| 112 | P112 | Unset | 0.515 | 2.849 | 0.18 |
| 114 | P114 | Right | 0.494 | 1.483 | 0.33 |
| 116 | P116 | Left | 0.454 | 1.463 | 0.31 |
| 118 | P118 | Unset | 0.434 | 1.382 | 0.31 |
| 120 | P120 | Right | 0.391 | 1.279 | 0.30 |
| 122 | P122 | Left | 0.372 | 1.197 | 0.31 |
| 124 | P124 | Right | 0.333 | 0.705 | 0.47 |
| 126 | P126 | Left | 0.351 | 0.681 | 0.51 |
| 128 | P128 | Right | 0.413 | 0.764 | 0.54 |
| 130 | P130 | Left | 0.474 | 0.887 | 0.53 |

As may be recognized by those of ordinary skill in the pertinent art based on the teachings herein, numerous changes and modifications may be made to the above-described and other embodiments of the present invention without departing from its scope as defined in the appended claims. For example, the geometry of the teeth may take any of numerous different shapes and/or dimensions other than those disclosed herein. Similarly, the teeth may take any of numerous different sets, pitches, set patterns, and/or pitch patterns other those disclosed herein. Accordingly, this detailed description of preferred embodiments is to be taken in an illustrative as opposed to a limiting sense.

What is claimed is:

1. A band saw blade for cutting a workpiece and generating a chip load on each tooth upon cutting the workpiece, comprising:

a plurality of teeth defining a pitch pattern of at least eight teeth, and set patterns within each pitch pattern; wherein each set pattern is defined by an unset leading tooth and a plurality of offset trailing teeth, each offset trailing tooth is offset in a respective set direction relative to the unset leading tooth, and each offset trailing tooth defines approximately the same set magnitude as every other like set tooth within the respective set pattern;

each tooth within each set pattern defines a pitch between the respective tooth and the preceding tooth in a cutting direction of the saw blade, and an accumulated pitch between the respective tooth and a preceding tooth of like set direction in the cutting direction of the saw blade; and the ratio of pitch to accumulated pitch for each tooth of like set direction within each set pattern increases from one tooth to the next in the direction opposite the cutting direction of the saw blade for distributing the chip load over the teeth of the saw blade.

2. A band saw blade as defined in claim 1, wherein the plurality of teeth define an even number pitch pattern of at least eight teeth, and odd number set patterns within each pitch pattern.

3. A band saw blade as defined in claim 2, wherein the plurality of teeth define an eight tooth pitch pattern, and three/five set pattern.

4. A band saw blade as defined in claim 2, wherein the plurality of teeth define a ten tooth pitch pattern, and three/seven set pattern.

5. A band saw blade as defined in claim 1, wherein each tooth defines a different pitch than every other tooth within its respective pitch pattern.

6. A band saw blade as defined in claim 1, wherein each tooth defines a different pitch than every other tooth within its respective set pattern.

7. A band saw blade as defined in claim 1, wherein each of said offset teeth defines approximately the same tooth height as every other like set tooth within the respective set pattern.

8. A band saw blade as defined in claim 1, wherein each of said offset teeth defines approximately the same set magnitude as every other like set tooth within the respective pitch pattern.

9. A band saw blade for cutting a workpiece and generating a chip load on each tooth upon cutting the workpiece, comprising:

a plurality of teeth defining a pitch pattern of at least eight teeth, set patterns within each pitch pattern, and a plurality of groups of teeth of like set direction within each pitch pattern, wherein each tooth defines a tooth spacing between the respective tooth and a preceding tooth in the cutting direction of the saw blade, and an accumulated tooth spacing between the respective tooth and a preceding tooth of like set direction in the cutting direction of the saw blade, and each set tooth defines approximately the same set magnitude as every other tooth of like set direction within the respective set pattern;

first means for substantially evenly distributing the chip load over each group of teeth of like set direction when cutting the workpiece; and second means for generating a different forcing frequency for each tooth entering and exiting the workpiece in comparison to at least one of (i) every other tooth simultaneously entering or exiting the workpiece, and (ii) every other tooth successively entering or exiting the workpiece, when cutting the workpiece.

10. A band saw blade as defined in claim 9, wherein the first means includes a plurality of unset raker teeth within each pitch pattern, and a plurality of offset trailing teeth following each unset raker tooth within each set pattern.

11. A band saw blade as defined in claim 10, wherein each set pattern includes a plurality of groups of right set teeth, and a plurality of groups of left set teeth.

12. A band saw blade as defined in claim 11, wherein at least one group of right set teeth includes a primary right set tooth, a secondary right set tooth, and a tertiary right set tooth.

13. A band saw blade as defined in claim 12, wherein the first means is further defined by the ratio of pitch to accumulated pitch being greater for the secondary right set tooth in comparison to the primary right set tooth, and being greater for the tertiary right set tooth in comparison to the secondary right set tooth.

14. A band saw blade as defined in claim 11, wherein at least one group of left set teeth includes a primary left set tooth, a secondary left set tooth, and a tertiary left set tooth.

15. A band saw blade as defined in claim 14, wherein the first means is further defined by the ratio of tooth spacing to accumulated tooth spacing being greater for the secondary left set tooth in comparison to the primary left set tooth, and being greater for the tertiary left set tooth in comparison to the secondary left set tooth.

16. A band saw blade as defined in claim 9, wherein the second means is defined by each tooth having a different forcing frequency than every other tooth within its respective set pattern.

17. A band saw blade as defined in claim 9, wherein the second means is defined by each tooth having a different forcing frequency than every other tooth within its respective pitch pattern.

18. A band saw blade as defined in claim 9, wherein the first means is defined by a plurality of unset raker teeth within each pitch pattern, and offset trailing teeth following each unset raker tooth within each set pattern, and is further defined by the ratio of tooth spacing to accumulated tooth spacing for each tooth of like set direction within each set pattern increasing from one tooth to the next in the direction opposite the cutting direction of the saw blade.

19. A band saw blade as defined in claim 9, wherein the plurality of teeth define an even number pitch pattern of at least eight teeth, and odd number set patterns within each pitch pattern.

20. A band saw blade as defined in claim 19, wherein the plurality of teeth define an eight tooth pitch pattern, and a three/five set pattern.

21. A band saw blade as defined in claim 19, wherein the plurality of teeth define a ten tooth pitch pattern, and three/seven set patterns.

22. A band saw blade as defined in claim 9, wherein the second means is defined by each tooth having a different tooth spacing than every other tooth within its respective pitch pattern.

23. A band saw blade as defined in claim 9, wherein the second means is defined by each tooth having a different tooth spacing than every other tooth within its respective set pattern.

24. A band saw blade for cutting a workpiece and generating a chip load on each tooth upon cutting the workpiece, comprising:

recurrent patterns of at least eight teeth per pattern;

at least two set patterns within each recurrent pattern of at least eight teeth, wherein each set pattern includes an unset leading tooth and a plurality of offset trailing teeth, and wherein each offset trailing tooth is offset in a respective set direction relative to the unset leading tooth, and defines approximately the same set magnitude as every other tooth of like set direction within the respective set pattern; and wherein each tooth defines a pitch between the respective tooth and the preceding tooth in a cutting direction of the saw blade, and each tooth defines a different pitch than every other tooth in the respective set pattern to thereby define a different forcing frequency for each tooth in comparison to every other tooth in the respective set pattern.

25. A band saw blade as defined in claim 24, wherein each of said offset teeth defines approximately the same set magnitude as every other like set tooth within the respective recurrent pattern of at least eight teeth.

26. A band saw blade as defined in claim 24, wherein each of said offset teeth defines approximately the same tooth height as every other like set tooth within the respective set pattern.

27. A band saw blade as defined in claim 24, wherein each tooth defines a different pitch than every other tooth in the respective recurrent pattern of at least eight teeth to thereby define a different forcing frequency for each tooth in comparison to every other tooth in the respective recurrent pattern.

* * * * *